United States Patent Office 3,034,911
Patented May 15, 1962

3,034,911
TABLET DISINTEGRANTS
Ian K. McKee, Plainfield, and William Herbst, North Plainfield, N.J., assignors to National Starch and Chemical Corporation, a corporation of Delaware
No Drawing. Filed Mar. 25, 1959, Ser. No. 801,698
5 Claims. (Cl. 106—210)

This invention relates to improved tablet disintegrants, and to the tablets containing said disintegrants. It is an object of our invention to provide certain starch derivatives whose effectiveness as tablet disintegrants is far greater than the raw corn starch ordinarily employed for this purpose. Other objects include the use of these improved disintegrants as components of tablets containing pharmaceuticals, bleaches, laundry starches and such other substances as may be distributed and used in the form of compressed tablets.

As is well known in the art, compressed tablets are ordinarily formulated so as to contain certain substances for the purpose of aiding or accelerating the disintegration of the tablets at the time of their use—that is, when they are to be dispersed in water, gastric or intestinal juices, or other fluids. These substances are referred to as disintegrants, and for many years raw corn starch has been the standard disintegrant for compressed tablets in the pharmaceutical and other industries.

It is obvious that in most applications, it is desirable that the tablet, when used, disperse as rapidly as possible, so that the active ingredients thereof might take effect. With this in mind, there have been attempts to find materials which would be more effective than corn starch in aiding the disintegration of tablets. Thus, materials such as pregelatinized (i.e. drum-dried) starches, as well as yellow dextrines, have been tested for this purpose, but they did not prove satisfactory.

We have now discovered that a particular class of starch derivatives is remarkably effective in accelerating the disintegration of compresed tablets. This class comprises those starch derivatives which are ungelatinized (i.e. still retain their original granule form) and which swell and disperse in cold water.

Before describing our invention in detail, it might be helpful to discuss briefly the mechanism of starch gelatinization, and the meaning of terms such as "swelling" and "dispersing" with regard to starches and their derivatives. Regardless of its plant source (e.g. corn, potato, tapioca, sago, rice, etc.), untreated starch exists in the form of discrete granules of complex structure. When suspended in water at room temperature these granules quickly settle out; in other words, they do not form a stable dispersion. Under the influence of heat, or certain chemicals such as strong alkalis, the granules in the presence of water are "gelatinized." This involves the swelling of the granules, followed by their disruption and dispersal thoughout the liquid. As contrasted to the mere temporary suspension of ungelatinized starch granules, a gelatinized starch forms a relatively stable, hydrated colloidal dispersion, in which the original starch granules no longer exist as such. A gelatinized starch dispersion which has been dried will ordinarily, upon mixing with water at room temperature, re-form a hydrated colloidal dispersion. Although such dispersions are not true solutions in the strictly technical sense, the term "cold water soluble" is often applied to starches which are capable of forming relatively stable, hydrated colloidal dispersions in water at room temperatures.

A common form of "cold water soluble" starch is one in which raw starch, suspended in water, has been passed over heated drums which act to gelatinize and dry the starch, so that the resulting dry product may be readily "dissolved" or dispersed in water at ordinary temperatures. These are often called "drum-dried" starches.

The starch derivatives employed in our invention are cold water dispersible in that they first swell, and then disperse, in water or other fluids (such as gastric or intestinal juices) so as to form a hydrated colloidal dispersion. However, they differ from the usual drum-dried, pregelatinized, cold water dispersible starches in a most important respect. Whereas the pregelatinized starches have had their granule structure destroyed, the cold water dispersible starches used in our invention still retain the discrete granule structure of the original untreated starch. Thus, the starches employed as tablet disintegrants in our invention must have a unique combination of properties— they must be in the form of the original ungelatinized granules, and they must nevertheless be capable of swelling and dispersing in cold water.

When present as components of compressed tablets, these special starch derivatives bring about a notable increase in the rate of disintegration of the tablets in water or other dispersing fluids. It is believed that their effectiveness results from the fact that the roughly spherical starch granules retain their shape when compressed in the tablets and absorb water into the tablet by capillary action. Meanwhile, the swelling of these starch granules upon contact with moisture increases still further the surface area exposed to moisture, and this swelling together with the water dispersibility of the granules vastly accelerates the dispersion of the tablet itself. When one uses untreated corn starch, as in the prior art, there is probably also a certain amount of this capillary attraction of moisture into the tablet, but since the raw starch granule does not swell appreciably in cold water, and since it is not cold water dispersible, the effectiveness of the raw starch in breaking up and dispersing the tablet is ordinarily very much poorer.

Similarly, pregelatinized starches are relatively ineffective, and it is believed that this is due to the fact that such a starch is no longer in the form of spherical granules, but exists rather as flat flakes or platelets. These flakes compress in the tablet to an unsuitably high density. Furthermore, pregelatinized starches have a marked tendency to lump when added to water, rather than to undergo a period of swelling followed by complete dispersion. Whether for these reasons, or for others, they are not suitable. As already stated, yellow dextrines, which also no longer appear to undergo the process of granule swelling before dispersion, are equally unsuitable as tablet disintegrants.

Any ungelatinized, cold water dispersible starch derivatives are effective for the purposes of our invention. These result from chemical treatment of starches, and several such methods are known. Thus, an ungelatinized, cold water dispersible starch phosphate may be prepared by heating ungelatinized starch with phosphoric acid or a phosphate salt, with or without an organic amide such as urea. A starch sulfate may be made by heating starch with sulfamic acid and an organic amide. A carboxymethyl starch, in the original granule form, may be made by heating starch, into which has been sprayed a concentrated solution of sodium hydroxide, followed by a spray of monochloroacetic acid (or, in place of the acid one may blend the starch with sodium chloroacetate). Purely by way of example, and without limitation, we shall now describe typical procedures for making each of the above-mentioned starch types. All parts are by weight.

*Starch phosphate.*—A solution is made of 1.5 parts sodium monohydrogen phosphate ($Na_2HPO_4$) and 4.5 parts sodium dihydrogen phosphate ($NaH_2PO_4$) in 20 parts water. This is sprayed into 100 parts of commercially dry, ungelatinized corn starch. The starch is then passed on belts for about 15 minutes through a series of ovens wherein the heat is increased progressively from about 290° C. to about 400° C. The resulting product is a cold water dispersible, ungelatinized starch phosphate. In another method of making a starch phosphate, a solution comprising 100 parts of urea and 50 parts of phosphoric acid (85% concentration) in 70 parts of water, is sprayed into 1000 parts of ungelatinized corn starch, which is then heated as described above. Here too, the resulting product is a cold water dispersible, ungelatinized starch phosphate.

*Starch sulfate.*—A solution is made of 198 parts urea and 90 parts sulfamic acid in 612 parts water, the pH of the solution is adjusted to 6.7 with ammonia, and 600 parts ungelatinized potato starch are then suspended in this solution. The starch is separated by filtration, air dried to about 9.6% moisture content and heated in an over for 2½ hours at about 150° C. An ungelatinized, cold water dispersible starch sulfate results.

*Carboxymethyl starch.*—300 parts ungelatinized corn starch are dry-blended with 60 parts sodium chloroacetate; the blend is then sprayed with 60.5 parts of a 72% aqueous solution of sodium hydroxide, and the mixture slowly heated, for about 8 hours, with the temperature rising to about 82° C. The pH may be adjusted to about 10, by any convenient means. The resulting product is a cold water dispersible carboxymethyl starch in the original intact granule form.

In the subsequent examples, illustrating actual tablet formulations, the starch phosphates, sulfates and carboxymethyl starches therein referred to were made according to the above-described procedures, except that the particular starches treated were varied as indicated (e.g. corn, potato, sago, wheat etc.). It must be emphasized, however, that derivatives made by other methods are equally suitable, since it is not the particular chemical group but rather the combination of intact granule structure and the properties of cold water swelling and cold water dispersibility which makes these derivatives so effective as tablet disintegrants.

The technique of using these starches in tablets formulations is simple, involving merely their addition to the particular tablet formulation under consideration. They may be compounded with all types of pharmaceuticals, laundry starches, bleaches or other materials, and are fully compatible with all of the additives which particular formulations may require.

With reference to proportions, we have found that as little as 1% of the starch derivative, based on the weight of the entire formulation, gives substantial improvement in rate of tablet disintegration, and on the other hand amounts as high as 50% have been employed successfully for some tablets. We ordinarily prefer to use amounts ranging from 3% to 20% of the starch derivative, based on the total weight of the formulation. While large proportions of the starch derivative are still effective as disintegrants, they sometimes have a tendency to make the resulting tablet somewhat softer and more fragile, and therefore are not usually advisable unless the particular formulation requires such large amounts for proper disintegration. Since the starch is merely an additive to aid the disintegration of the compressed tablet, it is obvious that it is the portion of the tablet other than the starch which must be considered the principal functional component of the tablet.

The following examples will more clearly illustrate the embodiment of our invention. All parts are given by weight, unless otherwise specified.

Example 1

In this example we prepared two types of standardized tablets, each containing 5% of a tablet disintegrant, and by testing a number of disintegrant materials showed the superior effectiveness of the ungelatinized, cold water dispersible starch derivatives.

*Formulation A—Milk sugar tablets.*—A dry granulation was prepared from the following formula:

| | Parts |
|---|---|
| U.S.P. spray dried lactose | 86 |
| U.S.P. talcum | 5 |
| Magnesium stearate | 1 |
| Stearic acid | 1 |
| Gum arabic | 2 |
| Disintegrant | 5 |

The above ingredients were thoroughly blended, passed through a 20 mesh screen and then tableted on a Stokes Eureka Tablet Press, as sold by the F. J. Stokes Machine Co. of Philadelphia, Pa. This press was used with a 11/32" beveled, bisected die and at a maximum pressure of 1.5 tons. From each of the different batches containing the various disintegrants, we selected 10 tablets, at random, from every 100 prepared and determined their hardness on a Stokes Spring-Type hardness tester, as sold by the F. J. Stokes Machine Co. In using this device, the value obtained in kilograms per square centimeter is in direct proportion to the hardness of the tablet being tested and, as the results of these tests indicated, all of the tablets prepared had approximately the same degree of hardness.

Disintegration tests were conducted in beakers containing 500 ml. of distilled water maintained at a temperature of 25° C. and stirred at a constant rate of 100 r.p.m. Disintegration time was taken as the total time required for a tablet to disappear completely, starting from the moment that it had been dropped into one of the above described beakers. Ten repetitions were run on each type of disintegrant and the average results for these tests as well as for the hardness tests are presented below in tabular form.

| Disintegrant | Average Hardness (kg./sq. cm.) | Average Disintegration Time (sec.) |
|---|---|---|
| corn starch | 12.4 | 1,865 |
| white corn dextrin | 14.6 | 2,069 |
| oxidized corn starch | 8.9 | 2,105 |
| yellow corn dextrin | 7.7 | >2,200 |
| pasty white corn dextrin | 13.7 | >2,200 |
| British Gum (from corn starch) | 5.9 | >2,200 |
| purified cellulose | 9.2 | >2,200 |
| drum dried, pregelatinized corn starch | 11.8 | 2,141 |
| ungelatinized cold water dispersible corn starch phosphate | 7.0 | 176 |
| ungelatinized cold water dispersible potato starch phosphate | 6.5 | 764 |
| ungelatinized cold water dispersible potato starch sulfate | 9.6 | 173 |

*Formulation B—Calcium gluconate tablets.*—A wet granulation comprising:

| | Parts |
|---|---|
| Calcium gluconate | 66 |
| U.S.P. spray dried lactose | 20 |
| Gum arabic | 2 |
| U.S.P. talcum | 5 |
| Magnesium stearate | 1 |
| Stearic acid | 1 |
| Disintegrant | 5 | was prepared by dry blending the calcium gluconate, lactose and gum arabic and then granulating this mixture with a 1:1 solution of isopropanol and distilled water so as to form a slightly damp mass. This mass was forced through a 10 mesh screen, air dried and forced through a 20 mesh screen. The talcum, magnesium stearate, stearic acid and disintegrant were next combined and thoroughly blended with this screened mixture. At this point the granulation was tableted and tested for hardness and disintegration time by the same procedures as described for Formulation A. The results are presented below.

| Disintegrant | Average Hardness (kg./sq. cm.) | Average Disintegration Time (sec.) |
|---|---|---|
| corn starch | 8.9 | >2,200 |
| yellow corn dextrin | 9.3 | >2,200 |
| white corn dextrin | 6.5 | >2,200 |
| pasty white corn dextrin | 10.9 | >2,200 |
| British Gum (from corn starch) | 12.5 | >2,200 |
| drum dried, pregelatinized corn starch | 15.5 | >2,200 |
| purified cellulose | 7.8 | >2,200 |
| ungelatinized potato starch phosphate | 11.1 | 1,181 |
| ungelatinized carboxymethyl corn starch | 10.4 | 587 |
| ungelatinized corn starch phosphate | 7.3 | 221 |
| ungelatinized potato starch sulfate | 9.1 | 300 |

Repetitions of Formulations A and B were made in which the cold water dispersible, ungelatinized phosphate and sulfate esters and the carboxymethyl ether were prepared from wheat, tapioca, waxy maize, and sago starches. These derivatives produced results comparable to those achieved with the derivatives prepared from corn and potato starch.

*Example II*

This example illustrates the superior results obtained with a cold water dispersible, ungelatinized starch phosphate ester tablet disintegrant when used at different levels of addition, as compared to the results obtained when using a standard raw corn starch disintegrant at similar levels of addition.

Granulations containing various levels of either ordinary corn starch or ungelatinized, cold water dispersible corn starch phosphate ester disintegrants were prepared using Formulation A of Example I. These granulations were tableted and tested for hardness and disintegration time by the same procedures as described for Formulation A. The results are presented below.

| Disintegrant | Percent by wt. of Formulation | Average Hardness (kg/sq. cm.) | Average Disintegration Time (sec.) |
|---|---|---|---|
| corn starch phosphate | 5.0 | 9.5 | 203 |
| Do | 3.0 | 10.7 | 272 |
| Do | 1.0 | 11.3 | 1,675 |
| corn starch (untreated) | 5.0 | 9.0 | >2,200 |
| Do | 3.0 | 9.7 | >2,200 |
| Do | 1.0 | 11.1 | >2,200 |

*Example III*

This example illustrates the importance of the intact granule structure of our starch derivatives in connection with their effectiveness as high speed tablet disintegrants. This was shown by contrasting the disintegration rate of tablets containing one of our selected starch derivatives with the rate observed in similar tablets prepared with a chemically identical derivative which was, however, lacking this essential intact granule structure.

For this example we prepared an aqueous dispersion of our ungelatinized cold water dispersible corn starch phosphate ester. This, of course, destroyed the granule structure of this derivative, and we then precipitated it from the dispersion by adding an excess of ethyl alcohol. The precipitated starch phosphate, which now no longer retained the original granule structure, was separated from the water-alcohol solution and allowed to air dry. It was then used as the tablet disintegrant for the milk sugar tablets whose preparation was described in Formulation A of Example I. At the same time, we prepared identical tablets using the ungelatinized starch phosphate ester with an intact granule structure as the disintegrant. Both groups of tablets were tested for hardness and disintegration time according to the procedure described for Formulation A of Example I. The results are presented below.

| Disintegrant | Average Hardness (kg./sq. cm.) | Average Disintegration Time (sec.) |
|---|---|---|
| corn starch phosphate with intact granule structure | 9.1 | 204 |
| corn starch phosphate lacking intact granule structure | 9.5 | 2,000 |

From these results it is obvious that an intact granule structure plays a vital part in the disintegration efficiency of our ungelatinized, cold water swelling and dispersible starch derivatives.

*Example IV*

This example illustrates the use of our ungelatinized, cold water dispersible starch derivatives as disintegrants for tablets prepared from various types of substances.

*Formula A—Tranquilizer tablet.—*

Parts
2-methyl-2-n-propyl-1,3, propanediol dicarbamate __ 400
Methylcellulose _____ 32.4
Magnesium stearate _____ 6.48

The above ingredients were mixed, and to 195 parts of the mixture there were then added 6 parts of magnesium stearate. To the latter mixture there were added disintegrants as indicated below, and the material was then compressed into tablets in the usual manner.

Sample 1 contained 5% by weight of ungelatinized, cold water dispersible corn starch phosphate.

Sample 2 contained 10% of ungelatinized, cold water dispersible corn starch phosphate.

Sample 3 contained 5% of untreated corn starch.

Sample 4 contained 10% of untreated corn starch.

The disintegration time for the tablets was determined according to the U.S. Pharmacopoeia procedure, in which the tablets were supported upon a sheet of 10 mesh woven wire cloth within individual open ended glass tubes. These tubes were then lowered, at a frequency between 28 and 32 cycles per minute, into a container of water which was maintained at a constant temperature of 37° F. (plus or minus 2). Disintegration time was calculated as the total time elapsed until substantially no residue remained on the wire cloth. The test was repeated ten times for each sample; the average results of these tests are listed below:

| Sample | Average Disintegration Time |
|---|---|
| 1 | 15 minutes. |
| 2 | 10 minutes. |
| 3 | more than 4 hours. |
| 4 | 45 minutes. |

*Formulation B—Detergent tablet.—*A dry granulation was prepared by mixing the following ingredients:

Parts
"Nacconol NRSF" (anionic alkyl aryl sulfonate detergent—sold by Allied Chemical & Dye Corp.) __ 65
Talc _____ 15
Ungelatinized, cold water dispersible corn starch phosphate _____ 20

The above material was formed into tablets on a Stokes "Eureka" Tablet Press, which was used with a $^{11}/_{32}$" beveled bisected die and at a maximum pressure of 1.5 tons. The resulting tablets disintegrated in an average time of 600 seconds, which was a notably more rapid rate than observed with similar tablets prepared with an ordinary untreated corn starch disintegrant.

*Formulation C—Laundry bleach tablet.*—A mixture was made from the following ingredients:

| | Parts |
|---|---|
| Sodium hexametaphosphate | 41.7 |
| Sodium perborate | 12.5 |
| Sodium sulfate | 45.8 |
| Gum arabic (binder) | 2.0 |
| Ungelatinized, cold water dispersible corn starch phosphate | 11.0 |

This granulation was prepared by first dry blending the sodium hexametaphosphate, sodium perborate, sodium sulfate, and gum arabic and then granulating this mixture with a 1:1 solution of isopropanol and distilled water so as to form a slightly damp mass. This mass was forced through a 20 mesh screen, dried and again forced through a 20 mesh screen. The corn starch phosphate was next combined and thoroughly blended with this screened mixture. At this point the granulation was tableted by the same procedure as described for Formulation A of this example. The resulting tablets disintegrated in an average time of 700 seconds which was, again, a far more rapid rate than was observed with similar tablets prepared with an ordinary corn starch disintegrant.

In summary, it is seen that our invention provides compressed tablets characterized by a notably improved rate of disintegration upon contact with water, gastric and intestinal juices or other aqueous fluids, this improved disintegration rate being achieved by the incorporation in the tablets of a starch derivative which is ungelatinized, cold water swelling and cold water dispersible. Variations in materials, proportions and procedures will be apparent to the practitioner, without departing from the scope of the invention, which is limited only by the following claims.

We claim:
1. A compressed tablet composition consisting essentially of a mixture of a principal component disintegratable in an aqueous fluid and an additive ingredient to accelerate the disintegration of said principal component, the said additive ingredient comprising a cold water swelling and cold water soluble ungelatinized starch product in intact granule form and in an amount of from 1% to 50% based on the total weight of the tablet composition.
2. The compressed tablet of claim 1 in which the starch product is an ungelatinized, cold water swelling, cold water dispersible starch phosphate.
3. The compressed tablet of claim 1 in which the starch product is an ungelatinized, cold water swelling, cold water dispersible starch sulfate.
4. The compressed tablet of claim 1 in which the starch product is ungelatinized, cold water swelling, cold water dispersible carboxymethyl starch ether.
5. The compressed tablet of claim 1 in which the starch product is in an amount from 3% to 20% based on the total weight of the tablet composition.

References Cited in the file of this patent

UNITED STATES PATENTS

| | | |
|---|---|---|
| 2,014,794 | Bierly | Sept. 17, 1935 |
| 2,116,867 | Kreimeier | May 10, 1938 |
| 2,374,676 | Gardner | May 1, 1945 |
| 2,599,620 | Filbert | June 10, 1952 |
| 2,822,281 | Masley | Feb. 4, 1958 |
| 2,884,412 | Neukom | Apr. 28, 1959 |

FOREIGN PATENTS

| | | |
|---|---|---|
| 203,853 | Australia | Aug. 26, 1955 |
| 508,118 | Canada | Dec. 14, 1954 |
| 536,634 | Canada | Jan. 29, 1957 |